United States Patent
Kosaka

(10) Patent No.: US 12,013,288 B2
(45) Date of Patent: Jun. 18, 2024

(54) BOLOMETER AND METHOD FOR MANUFACTURING SAME

(71) Applicant: NEC Corporation, Tokyo (JP)

(72) Inventor: Mayumi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/731,435

(22) Filed: Apr. 28, 2022

(65) Prior Publication Data

US 2022/0364928 A1 Nov. 17, 2022

(30) Foreign Application Priority Data

May 12, 2021 (JP) .................................. 2021-080882

(51) Int. Cl.
*G01J 5/061* (2022.01)
*G01J 5/02* (2022.01)
*G01J 5/04* (2006.01)
*G01J 5/22* (2006.01)

(52) U.S. Cl.
CPC ............. *G01J 5/061* (2013.01); *G01J 5/0205* (2013.01); *G01J 5/0215* (2013.01); *G01J 5/046* (2013.01); *G01J 5/22* (2013.01)

(58) Field of Classification Search
CPC ........ G01J 5/061; G01J 5/0205; G01J 5/0215; G01J 5/046; G01J 5/22; G01J 5/024; G01J 5/20; B82Y 30/00; C01B 32/174
See application file for complete search history.

(56) References Cited

U.S. PATENT DOCUMENTS

| 7,645,497 | B2 * | 1/2010 | Spath ..................... B82Y 10/00 345/173 |
| 11,650,104 | B2 * | 5/2023 | Tanaka ..................... G01J 5/20 250/338.4 |
| 2005/0255304 | A1 * | 11/2005 | Brink ..................... B82Y 10/00 428/209 |
| 2011/0101302 | A1 * | 5/2011 | Zhou ..................... H10K 59/123 438/479 |
| 2011/0244203 | A1 * | 10/2011 | Wu ......................... C08J 7/043 428/419 |
| 2011/0244247 | A1 * | 10/2011 | Wu ......................... C08L 79/08 526/248 |

(Continued)

FOREIGN PATENT DOCUMENTS

| JP | 6455910 B2 | 1/2019 |
| JP | 6717316 B2 | 7/2020 |
| WO | 2012/049801 A1 | 4/2012 |

OTHER PUBLICATIONS

U.S. Office Action for U.S. Appl. No. 17/731,808, dated Mar. 22, 2023.

*Primary Examiner* — David P Porta
*Assistant Examiner* — Gisselle M Gutierrez
(74) *Attorney, Agent, or Firm* — Sughrue Mion, PLLC

(57) ABSTRACT

An object of the present invention is to provide a bolometer having a high TCR value and a low resistance, and a method for manufacturing the same.
According to the present invention, a bolometer manufacturing method including: fabricating an interlayer having a function that enhances binding between a substrate and a carbon nanotube, in a predetermined shape on the substrate; and, making a semiconducting carbon nanotube dispersion liquid move on the interlayer in one direction relative to the fabricated interlayer is provided.

13 Claims, 5 Drawing Sheets

(56) References Cited

U.S. PATENT DOCUMENTS

| | | | |
|---|---|---|---|
| 2011/0315981 A1* | 12/2011 | Xu | G01J 5/046 |
| | | | 438/54 |
| 2012/0145968 A1* | 6/2012 | Shimizu | C08L 65/00 |
| | | | 427/407.1 |
| 2013/0216469 A1 | 8/2013 | Sekino | |
| 2013/0264542 A1* | 10/2013 | Wu | G01J 5/0853 |
| | | | 257/21 |
| 2013/0284344 A1* | 10/2013 | Feng | B32B 37/20 |
| | | | 977/932 |
| 2013/0287998 A1* | 10/2013 | Feng | H01B 1/18 |
| | | | 428/292.1 |
| 2014/0105242 A1* | 4/2014 | Fernandes | G01J 5/023 |
| | | | 374/185 |
| 2018/0171115 A1* | 6/2018 | Sagitani | C08L 9/00 |
| 2019/0129300 A1 | 5/2019 | Ono et al. | |
| 2021/0017967 A1* | 1/2021 | Liu | C01B 32/168 |
| 2021/0214247 A1 | 7/2021 | Takagi et al. | |
| 2022/0109076 A1* | 4/2022 | Yuge | H01L 31/028 |
| 2022/0221346 A1* | 7/2022 | Yuge | B82Y 30/00 |
| 2022/0364928 A1* | 11/2022 | Kosaka | G01J 5/024 |
| 2022/0364931 A1* | 11/2022 | Kosaka | G01J 5/023 |
| 2022/0364933 A1* | 11/2022 | Kosaka | G01J 5/22 |

* cited by examiner

BOLOMETER AND METHOD FOR MANUFACTURING SAME

This application is based upon and claims the benefit of priority from Japanese patent application No. 2021-080882, filed on May 12, 2021, the disclosure of which is incorporated herein in its entirety by reference.

TECHNICAL FIELD

The present invention relates to a bolometer using carbon nanotubes and a method for manufacturing the same.

BACKGROUND ART

As infrared sensors, quantum infrared sensors using HgCdTe as a material have been widely used; however, it is necessary to cool an element to a temperature that is equal to or lower than a temperature of liquid nitrogen, imposing a restriction in downsizing of the apparatus. Therefore, uncooled infrared sensors not requiring cooling of an element to a low temperature have recently attracted attention and bolometers that detect an electrical resistance change caused by a change in temperature of an element have been widely used.

For performance of a bolometer, a rate of electrical resistance change for temperature change, which is called TCR (temperature coefficient of resistance), and a resistivity are particularly important. As an absolute value of the TCR is larger, a temperature resolution of the infrared sensor becomes smaller and the sensitivity is thus enhanced. Also, for noise reduction, the resistivity needs to be lowered.

Conventionally, as an uncooled bolometer, a vanadium oxide thin film is used; however, because of a vanadium oxide thin film having a small TCR (approximately −2.0%/K), enhancement in TCR has been widely studied. For TCR enhancement, a material having semiconducting properties and a large carrier density is needed, and thus, application of semiconducting single-walled carbon nanotubes to a bolometer is expected.

Patent Literature 1 proposes bolometer fabrication having a thin film process of employing normal single-walled carbon nanotubes for a bolometer portion, in which a dispersed liquid resulting from single-walled carbon nanotubes being mixed in an organic solvent is cast onto electrodes and the single-walled carbon nanotubes is subjected to annealing treatment in the air.

Patent Literature 2 proposes bolometer fabrication in which, because metal and semiconducting components are mixed in a single-walled carbon nanotube, semiconducting single-walled carbon nanotubes are extracted using an ionic surfactant and employed for a bolometer portion.

CITATION LIST

Patent Literature

Patent Literature 1: International Publication No. WO2012/049801
Patent Literature 2: Japanese Patent No. 6455910

SUMMARY OF INVENTION

Technical Problem

However, in the carbon nanotube thin film used for the infrared sensor described in Patent Literature 1, since many metallic carbon nanotubes are present in a mixed state in carbon nanotubes, TCR is low, and the improvement of the performance of the infrared sensor is limited. In addition, the infrared sensor using semiconducting carbon nanotubes described in Patent Literature 2 has a problem in that the ionic surfactant for separation cannot be easily removed, and the resistance is high.

The present invention has been made in view of the above circumstances and an object of the present invention is to provide a bolometer comprising a carbon nanotube layer with a high alignment, and thus having a high TCR value and low resistance, and a method for manufacturing the same.

Solution to Problem

In order to solve the aforementioned problems, the present invention has the following features.

One aspect of the present invention relates to a bolometer manufacturing method comprising
fabricating an interlayer having a function that enhances binding between a substrate and a carbon nanotube, in a predetermined shape on the substrate, and
making a semiconducting carbon nanotube dispersion liquid move on the interlayer in one direction relative to the fabricated interlayer.

Advantageous Effect of Invention

According to the present invention, a bolometer comprising a carbon nanotube layer with a high alignment, and thus having a high TCR value and a low resistance can be provided.

DESCRIPTION OF EMBODIMENTS

Figure 1:
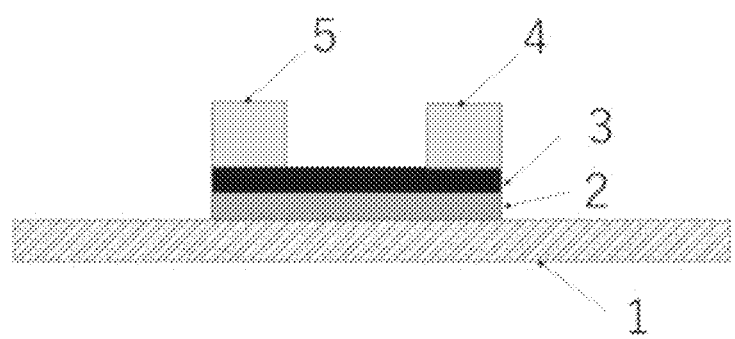
FIG. 1 is a sectional schematic view of a bolometer portion.

A bolometer manufacturing method according to an embodiment is described below in detail.

A bolometer manufacturing method of the present embodiment includes: a step of fabricating an interlayer having a function that enhances binding between a substrate and a carbon nanotube, in a predetermined pattern on the substrate (patterning); and a step of making a semiconducting carbon nanotube dispersion liquid move on the interlayer in one direction relative to the fabricated interlayer.

More specifically, an interlayer having a function that enhances binding between a substrate and the carbon nanotube is formed in a shape of, e.g., a line or a quadrangle on a substrate in such a manner that the interlayer approximately perpendicularly bridges a first electrode and a second electrode. Or, the interlayer is formed in a shape of a line or a quadrangle in such a manner that a part of the interlayer approximately perpendicularly bridges the first electrode and the second electrode. Subsequently, a semiconductor carbon nanotube dispersion liquid is provided to a part in which the interlayer is formed, in such a manner that the dispersion liquid moves in one direction from an end of the line or the quadrangle and drying the substrate, and there is thereby provided a bolometer manufacturing method in which carbon nanotubes are aligned perpendicularly to an electrode.

As stated above, patterning an interlayer having a function that enhances binding between a substrate and a carbon nanotube on a substrate enables easily forming a carbon nanotube film of, e.g., a line shape or a quadrangular shape in a desired shape and size on the substrate.

Furthermore, the bolometer manufacturing method of the present embodiment enables easily forming a highly-aligned carbon nanotube film in which a carbon nanotube is aligned along a direction in which a carbon nanotube dispersion liquid moves, by making the dispersion liquid move on the patterned interlayer in one direction relative to the patterned interlayer.

According to such a method, a bolometer comprising a carbon nanotube layer having a high alignment, and thus having a high TCR value and a low resistance, can be provided.

Also, according to an embodiment, a microscopic semiconducting carbon nanotube aligned film and a bolometer using the same can be provided via a simple method as described above.

Also, according to an embodiment, which is capable of downsizing a carbon nanotube layer having a high alignment, it is possible to downsize a bolometer element.

In addition, it is also advantageous that a manufacturing method according to an embodiment is excellent in high mass productivity and low cost.

In a manufacturing method of the present embodiment, the interlayer is not specifically limited as long as the interlayer is a layer made of a material that enhances binding between the substrate and the carbon nanotube.

It is preferable that a material of the interlayer be a compound having both a moiety that binds or adheres to a surface of the substrate and a moiety that binds or adheres to the carbon nanotube. Consequently, the interlayer functions as a medium serving to bind the substrate and the carbon nanotube. Here, for binding between the substrate and the interlayer, and binding between the interlayer and the carbon nanotube, not only chemical binding but also various intermolecular interactions such as electrostatic interaction, surface adsorption, hydrophobic interaction, van der Waals' force, hydrogen bonding can be used.

Also, it is preferable that the material of the interlayer be a compound that increases a lyophilic property of the surface of the substrate. Treatment using such compound enables a droplet of the carbon nanotube dispersion liquid to be provided and held mainly only on the part in which the interlayer is formed, and/or carbon nanotubes in the dispersion liquid be adhered mainly only on the part in which the interlayer is formed. Consequently, it is possible to easily control a shape and a size of the carbon nanotube film by patterning of the interlayer.

Examples of the moiety that binds or adheres to the surface of the substrate in the material of the interlayer include alkoxysilyl group (SiOR), SiOH, hydrophobic moiety, hydrophobic group, and the like. Examples of hydrophobic moiety and hydrophobic group include methylene group (methylene chain) and alkyl group each having a carbon number of preferably 1 or more, more preferably 2 or more, and preferably 20 or less, more preferably 10 or less, and the like.

Examples of the moiety that binds or adheres to the carbon nanotube in the material of the interlayer include amino groups such as primary amino group (—$NH_2$), secondary amino group (~$NHR_1$) or tertiary amino group (~$NR_1R_2$), ammonium group (~$NH_4$), imino group (=NH), imide group (~C(=O)—NH—C(=O)—), amide group (~C(=O)NH—), epoxy group, isocyanurate group, isocyanate group, ureide group, sulfide group, mercapto group, and the like.

The material of the interlayer is not specifically limited but examples thereof include a silane coupling agent. A silane coupling agent includes both a reactive group that binds to or interacts with an inorganic material and a reactive group that binds to or interacts with an organic material in a molecule, and serves to bind the organic material and the inorganic material. In the present embodiment, the carbon nanotube can be fixed on the substrate by forming a single-layer multimolecular film presenting a reactive group that binds to the carbon nanotube on the substrate using, for example, a silane coupling agent including both a reactive group that binds to a substrate such as an Si substrate and a reactive group that binds to a carbon nanotube.

Examples of the silane coupling agent include:

silane coupling agents (aminosilane compounds) each including amino group and alkoxysilyl group such as 3-aminopropyltrimethoxysilane, 3-aminopropylmethyltriethoxysilane, 3-aminopropylmethyltrimethoxysilane, 3-aminopropyltriethoxysilane (APTES), 3-(2-aminoethyl)aminopropyltrimethoxysilane, N-(2-aminoethyl)-3-aminopropyltrimethoxysilane, N-2-(aminoethyl)-3-aminopropylmethyltrimethoxysilane and N-(2-aminoethyl)-3-aminopropylmethyldimethoxysilane;

silane coupling agents each including epoxy group and alkoxysilyl group such as 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, 3-glycidoxypropyldiethoxysilane and triethoxy(3-glycidyloxypropyl)silane;

isocyanurate-based silane coupling agents such as tris-(trimethoxysilylpropyl)isocyanurate;

ureide-based silane coupling agents such as 3-ureidepropyltrialkoxysilane;

mercapto-based silane coupling agents such as 3-mercaptopropylmethyldimethoxysilane, 3-mercaptopropyltrimethoxysilane and 3-mercaptopropyltriethoxysilane;

sulfide-based silane coupling agents such as bis(triethoxysilylpropyl)tetrasulfide; and isocyanate-based silane coupling agents such as 3-isocyanatepropyltriethoxysilane.

Particularly, a silane coupling agent including amino group (aminosilane compound) is preferable because of good binding to carbon nanotubes.

Other examples of the material of the interlayer include polymers each including a moiety that can bind or adhere to a substrate such as a plastic substrate and a reactive group that binds to a carbon nanotube, for example, a cation polymer.

Examples of such polymers include poly(N-methylvinylamine), polyvinylamine, polyallylamine, polyallyldimethylamine, polydiallylmethylamine, polydiallyldimethylammonium chloride, polydiallyldimethylammonium trifluoromethanesulfonate, polydiallyldimethylammonium nitrate, poly diallyldimethylammonium perchlorate, polyvinylpyridinium chloride, poly(2-vinylpyridine), poly(4-vinylpyridine), polyvinyl imidazole, poly(4-aminomethylstyrene), poly(4-aminostyrene), polyvinyl(acrylamide-co-dimethylaminopropylacrylamide), polyvinyl(acrylamide-co-dimethylaminoethylmethacrylate), polyethylenimine (PEI), DAB-Am and polyamideamine dendrimer, polyaminoamide, polyhexamethylene biguanide, polydimethylamine-epichlorohydrin, a product of alkylation of polyethylenimine by methyl chloride, a product of alkylation of polyaminoamide by epichlorohydrin, cationic polyacrylamide using a cationic monomer, a formalin condensate of dicyandiamide, dicyandiamide, polyalkylenepolyamine polycondensate, natural cationic polymers (for example, partially deacetylated chitin, chitosan and chitosan salt), synthetic polypeptides (for example, polyasparagine, polylysine, polyglutamine and polyarginine).

Among such polymers, a cation polymer including amino group and hydrophobic group or hydrophobic moiety is preferable from the perspective of fixing carbon nanotubes to the substrate.

Use of such polymer enables forming an interlayer presenting a plurality of reactive groups that bind or adhere to carbon nanotubes on a substrate. Such interlayer is not specifically limited but is preferably a single molecular film, and can have a thickness of 1 nm to 1 μm, preferably 2 nm to 100 nm from the perspective of uniform adherence.

The material of the interlayer can appropriately be selected in consideration of the material of the substrate to be used. Here, a material forming the substrate may be an inorganic material or an organic material and any of those used in the relevant technical field can be used with no specific limitation. The inorganic material is not limited but examples thereof include, e.g., glass, Si, $SiO_2$, SiN and the like, and the organic material is not limited but, for example, plastic, rubber and the like are preferable, examples of which include, polyimide, polyethylene, polypropylene, polystyrene, polyvinyl chloride, polyethylene terephthalate, acrylonitrile styrene resin, acrylonitrile butadiene styrene resin, fluororesin, methacryl resin, polycarbonate and the like, and in an embodiment, a material used for a flexible substrate is preferable.

The invention of the present application has the features described above, and the embodiments will be explained below. Although the embodiments described below have technically preferred limitations for carrying out the invention, the scope of the invention is not limited to the following.

In each of the below embodiments, an example in which an APTES layer or a polylysine layer is used as an interlayer and an Si substrate or a plastic substrate is used as a substrate will be described; however, the interlayer and the substrate are not limited to these layers or substrates.

Also, in a bolometer manufacturing method, processes other than a process of forming a carbon nanotube layer on a substrate are not limited to those described below by example, and those used in the relevant technical field can be used with no specific limitation.

In the present specification, the term "approximately perpendicular" encompasses perfect perpendicularity, and deviations within a range of 30° or less, preferably 20° or less, for example, 10° or less from the perfect perpendicularity. The term "approximately parallel" encompasses perfect parallelism and deviations within a range of 30° or less, preferably 20° or less, for example, 10° or less from the perfect parallelism.

Also, terms such as "APTES adhering portion", "APTES applied portion" and "APTES portion" are synonymous and mean a region in which an interlayer is formed using APTES. "APTES layer" is also referred to as "APTES film" or the like.

Also, terms such as "carbon nanotube layer" and "carbon nanotube film" can be used synonymously. Also, "carbon nanotube aligned film" may simply be referred to as, e.g., "carbon nanotube layer".

Also, a bolometer according to the present embodiment can also be used for detection of electromagnetic wave having a wavelength of, for example, 0.7 μm to 1 mm, for example, terahertz wave in addition to infrared light. In an embodiment, the bolometer is an infrared sensor.

First Embodiment

FIG. 1 illustrates a schematic sectional view of a bolometer portion according to an embodiment of the present invention. A 3-aminopropyltriethoxysilane (APTES) layer 2 is provided on an Si substrate 1, a carbon nanotube layer 3, a first electrode 4 and a second electrode 5 are provided thereon, and the electrode 4 and the electrode 5 are connected via the carbon nanotube layer 3 located therebetween. The disposition of the APTES layer 2, the carbon nanotube layer 3 and the electrodes 4, 5 on the substrate 1 is not limited to the disposition illustrated in FIG. 1 but the electrode 4 and the electrode 5 may be disposed on the APTES layer 2 or may directly be disposed on the Si substrate 1. Also, as long as the carbon nanotube layer 3 is at least partly provided on APTES and connects the electrode 4 and the electrode 5, the carbon nanotube layer 3 may be provided above or below the electrodes. As described later, this carbon nanotube layer 3 mainly consists of a plurality of semiconducting carbon nanotubes separated preferably using a non-ionic surfactant.

Figure 2A:
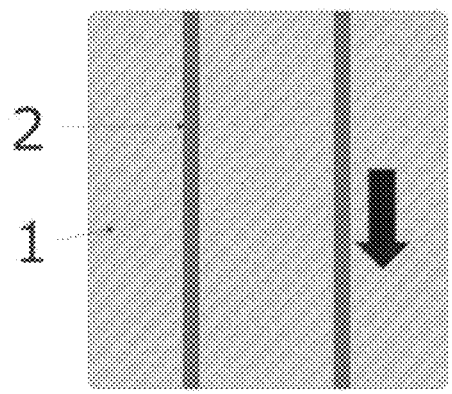
FIG. 2A is a schematic diagram of forming a line-shape APTES film on a substrate.
Figure 2B:
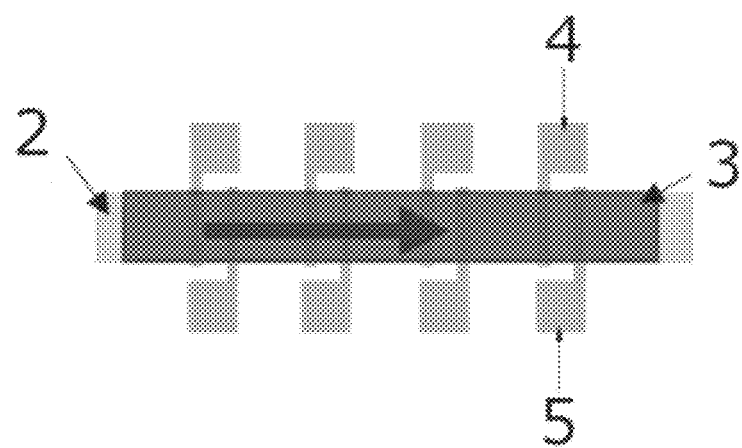
FIG. 2B is a schematic diagram of forming a carbon nanotube film on an APTES film, and arranging electrodes thereon.

FIG. 2A (upper diagram) illustrates a schematic plan view of an APTES layer 2 according to an embodiment of the present invention, the APTES layer 2 being formed in a line-shape pattern. A substrate Si coated with $SiO_2$ is sequentially washed with acetone, isopropyl alcohol and water and subjected to oxygen plasma treatment to remove organic substances on a surface. Parts, other than line-shape APTES portion in FIG. 2A (upper diagram), of the Si substrate are masked, and then, the substrate is immersed in an APTES aqueous solution, or an APTES aqueous solution is sprayed onto the substrate, and the substrate is washed with water and dried. Subsequently, the masking is removed from the substrate. The line-shape APTES portion may be applied using, e.g., a dispenser, an inkjet or a printer, and as necessary, washed with water and dried.

Figure 5:
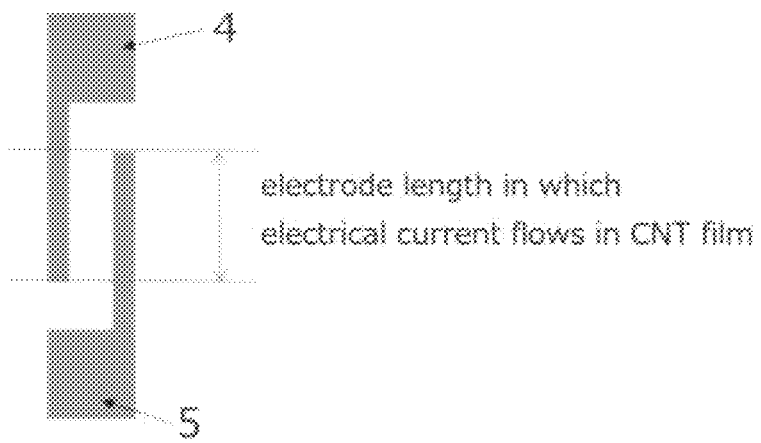
FIG. 5 is a schematic diagram showing an example of a positional relationship between an electrode pair and a carbon nanotube film.

A width a of the line shape is desirably 1 μm to 10 cm, preferably 2 μm to 1 cm, more preferably 5 μm to 2 mm. For downsizing, 100 μm or less may also be preferable. Also, in order to maximize an area in which electrical current flows via the carbon nanotube film, it is preferable that the width of the line shape be equal to or larger than an electrode length of a part in which the region of a pair of electrodes facing each other corresponds to a minimum device length. For example, in the case of a parallel electrode pair, an electrode length of a part in which the region of a pair of electrodes facing each other corresponds to a minimum device length is a length of a part in which the electrodes face each other in parallel. In the parallel electrode pair illustrated in FIG. 5, the length described as "electrode length in which electrical current flows in CNT film" in the figure corresponds to the electrode length.

A concentration of the APTES solution is preferably 0.001% by volume or more and 30% by volume or less, more preferably 0.01% by volume or more and 10% by volume or less, still more preferably 0.05% by volume or more and 5% by volume or less. Note that if a compound other than APTES is used as an interlayer, these concentration and solvent may arbitrarily be changed according to the compound used.

For the masking of parts except the line shapes, if the substrate is immersed in an APTES aqueous solution, for example, a tape such as a kapton tape or a masking tape, an adhesive sheet, or a mask material such as a resist can be used. If an APTES aqueous solution is sprayed to a substrate, a metal mask or a stencil mask that is in contact with the substrate can be used.

Upon a semiconducting carbon nanotube dispersion liquid resulting from dispersion in an aqueous solution of polyoxyethylene alkyl ether such as polyoxyethylene (100) stearyl ether or polyoxyethylene (23) lauryl ether, which is a non-ionic surfactant, being introduced from one end of the line-shape APTES adhering portion, the parts to which no APTES adheres (masked parts) repel the dispersion liquid, enabling the carbon nanotube dispersion liquid to flow only on the APTES adhering portions and/or enabling carbon nanotubes in the dispersion liquid to adhere only to the parts in which the interlayer is formed.

A method for introducing the carbon nanotube dispersion liquid is not specifically limited and may be any method as long as the method allows the dispersion liquid to move on an APTES film in one direction relative to the APTES film as indicated by an arrow in FIG. 2A. For example, where the dispersion liquid is provided on an APTES film in one direction, the dispersion liquid can be made to flow from a line end using, e.g., an injector or a pump, or, a droplet of a dispersion liquid can be dripped onto a line end and made to flow by the substrate being inclined. An angle of the inclination of the substrate is not specifically limited but can be, for example, 5° or more, preferably 10° or more, and for example, 90° or less, preferably 60° or less. Also, where the dispersion liquid is made to move on an APTES film, the dispersion liquid is made to move on the APTES line in one direction relative to the APTES line via a method such as, for example, moving the dispersion liquid or the substrate inside the dispersion liquid, or moving both the dispersion liquid and the substrate. An amount of supply, a concentration, etc., of the carbon nanotube dispersion liquid can appropriately be set as long as a desired density can be obtained when the carbon nanotube dispersion liquid is formed into a carbon nanotube film, and as long as the carbon nanotube dispersion liquid is provided mainly onto an APTES line and/or carbon nanotubes in the dispersion liquid mainly adhere only to a portion in which an APTES layer is formed.

A method for making the dispersion liquid or the substrate move in one direction inside the dispersion liquid is not specifically limited but a carbon nanotube film can be fabricated on APTES by making a substrate on which an APTES film is formed move in one direction in a liquid basin of a carbon nanotube dispersion liquid, for example, in a state provided with transportation means such as a belt conveyer, or by a tool capable of, e.g., pulling and pushing. The substrate or the dispersion liquid may be moved horizontally or may be moved with an inclination. The dispersion liquid may be made to move in one direction on the substrate via a method in which the substrate is inclined vertically and the substrate is immersed in the dispersion liquid and then pulled up like, for example, dip coating. Furthermore, in this method, the substrate may be obliquely inclined and pulled up as described above.

It is preferable that the carbon nanotube dispersion liquid comprises a surfactant, and in this case, if there is a direction in which the dispersion liquid flows, carbon nanotubes move in such a manner as to be aligned in the direction of the flow without being entangled with one another. At this time, amino groups are present on the APTES, and thus, some of the carbon nanotubes bind to the amino groups of the APTES, the carbon nanotubes are rested on the APTES and are absorbed on the APTES in such a manner as to be aligned along the flow. Upon a first layer of carbon nanotubes being absorbed on the APTES, a second layer onwards of carbon nanotubes are deposited in such a manner that aligned carbon nanotubes are bundled, and as a result, a carbon nanotube film aligned in a direction of the APTES lines, in which droplets flow, are fabricated.

Figure 3:
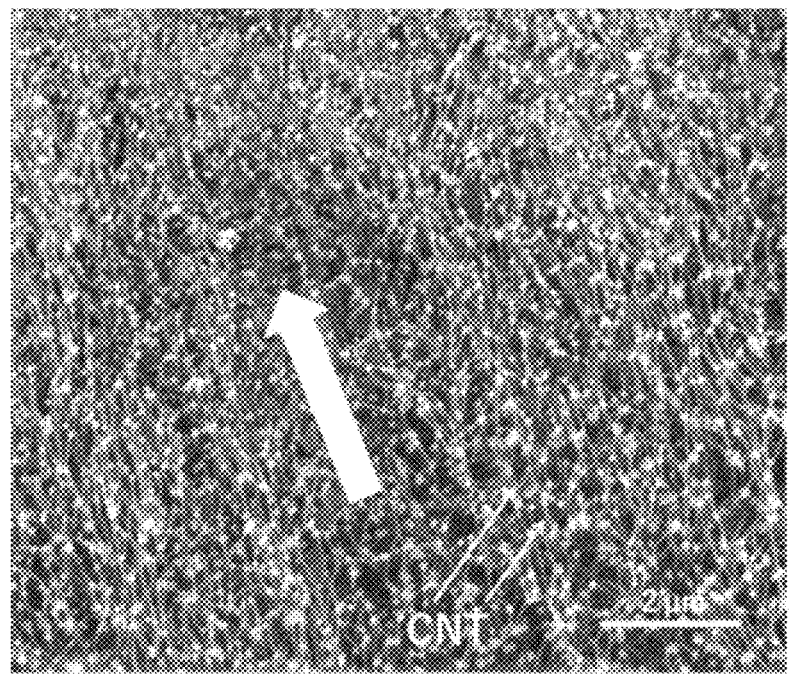
FIG. 3 is an SEM image of a carbon nanotube film on an APTES line.

FIG. 3 shows a scanning electron microscope (SEM) image of carbon nanotubes deposited on an APTES applied portion. A direction of an arrow (obliquely left-upward) in the SEM image is parallel to a direction of the APTES line. The carbon nanotubes are aligned approximately in parallel with the APTES line. The carbon nanotube film deposits substantially uniformly within a width of the line shape.

The thickness of the carbon nanotube layer is not particularly limited, but is preferably, for example, 1 nm or more, more preferably 2 nm or more, more preferably 5 nm or more, and preferably 1 µm or less, more preferably 500 nm or less, and even more preferably 100 nm or less. The thickness of the carbon nanotubes can be measured using a laser microscope at arbitrary 10 points, and the thickness can be taken as the average value.

In order to increase the degree of alignment, a temperature of the substrate and the dispersion liquid is, for example, desirably 5° C. to 60° C., preferably 10° C. to 40° C. A relative humidity is preferably 15% RH to 80% RH.

The degree of alignment of carbon nanotubes is defined in a plane FFT image obtained by performing two-dimensional fast Fourier transform on the SEM image of a carbon nanotube film and representing the distribution of unevenness in each direction by a frequency distribution, where a value obtained by integrating amplitudes of frequencies from −1 µm-1 to +1 µm-1 in one direction from the center is defined as an integrated value f, an integrated value in the direction x in which the integrated value f becomes maximum is defined as fx, an integrated value in the direction y vertical to the direction x is defined as fy, a degree of alignment of carbon nanotubes is represented with fx/fy, with fx/fy≥2 being preferable. The SEM image which is the original image of the above FFT image needs to have visible unevenness for calculation by Fourier transform, and from the viewpoint of observing carbon nanotubes, the visual field range is preferably about 0.05 to 10 µm in vertical and horizontal directions.

This definition of alignment can be applied to the aligned film in the embodiments described later.

A speed at which the carbon nanotube dispersion liquid moves on the substrate is not specifically limited, but is, for example, 10 mm/second or less, preferably 1 mm/second or less, more preferably 100 μm/second or less, still more preferably 10 μm/second or less because CNTs need to adhere to the APTES. An adequately higher moving speed is advantageous for alignment of carbon nanotubes, but decreases an amount of carbon nanotubes adhering to the APTES, and thus, if the amount of carbon nanotubes adhering is small, carbon nanotubes can be made to easily adhere onto the APTES, by repetitive processing or supplying the dispersion liquid continuously. From the perspective of forming a layer with a high degree of alignment, the speed is preferably 0.1 μm/second or more, and more preferably 0.5 μm/second or more.

The carbon nanotube layer comprises semiconducting carbon nanotubes preferably in a ratio of 90% by mass or more, more preferably 95% by mass or more, and in some cases even more preferably 98% by mass or more, of the total carbon nanotubes. For the production of such carbon nanotube layers, it is desirable to use a dispersion liquid with a high concentration of semiconducting carbon nanotubes, which is obtained by separating metallic carbon nanotubes and semiconducting carbon nanotubes using, for example, the electric field-induced layer formation method.

The diameter of the carbon nanotubes is desirably 0.6 to 1.5 nm, preferably 0.6 to 1.2 nm, and more preferably 0.6 to 1.0 nm. The length of the carbon nanotubes is preferably in the range of 100 nm to 5 μm for easy dispersion and easy droplet formation. From the perspective of the conductivity of carbon nanotubes, a length of 100 nm or more is preferred, and from the perspective of less aggregation, a length of 5 μm or less is preferred. More preferably, the length is 500 nm to 3 μm, even more preferably 700 nm to 1.5 μm. It is preferred that at least 70% (number) of the carbon nanotubes have a diameter and a length in the above range.

When the diameter and the length of the carbon nanotubes are within the above range, the effect of semiconducting property becomes greater when semiconducting carbon nanotubes are used, and a large current value can be obtained, so that a high TCR value is easily obtained when used in a bolometer.

The carbon nanotube dispersion liquid used in the manufacturing method according to the present embodiment is described below.

The carbon nanotube dispersion liquid comprises the above-described carbon nanotubes. The concentration and the amount of droplet may be appropriately selected depending on the density and thickness and the like of the carbon nanotube layer to be formed. The concentration of carbon nanotubes in the dispersion liquid is not particularly limited but may be, for example, 0.0003% by mass or more, preferably 0.001t % by mass or more, more preferably 0.003% by mass or more, and 10% by mass or less, preferably 3% by mass or less, more preferably 0.3% by mass or less.

The carbon nanotube dispersion liquid preferably comprises a surfactant in addition to carbon nanotubes. The concentration of the surfactant in the dispersion liquid is not particularly limited, but for example, a critical micelle concentration or more to about 5% by mass or less is preferred, and 0.001% by mass or more to 3% by mass or less is more preferable, and 0.01% by mass or more to 1% by mass or less is particularly preferred. The surfactant in the carbon nanotube dispersion liquid is preferably a non-ionic surfactant. Unlike ionic surfactants, non-ionic surfactants have a weaker interaction with carbon nanotubes, and can be easily removed after the dispersion liquid is provided on the substrate. Therefore, stable carbon nanotube conductive paths can be formed and an excellent TCR value can be obtained. Non-ionic surfactants with longer molecular lengths are also preferred as they increase the distance between carbon nanotubes when providing the dispersion liquid on the substrate and carbon nanotubes are less likely to re-aggregate after water evaporation, thus the aligned state can be maintained. Aligned carbon nanotubes results in a lower resistance as the contact area between carbon nanotubes is increased and more conductive paths are formed. Consequently, a larger resistance change for a temperature change can be achieved.

Non-ionic surfactants can be appropriately selected, and it is preferable to use a non-ionic surfactant with a polyethylene glycol structure, typified by polyoxyethylene alkyl ether-based ones, singly or in combination.

The solvent of the carbon nanotube dispersion liquid is not limited as long as the carbon nanotubes can be suspended in a dispersion, and includes, for example, water, heavy water, organic solvents or mixtures thereof, with water being preferred.

As the methods of separating and preparing a carbon nanotube dispersion liquid with a high proportion of semiconducting carbon nanotubes, and non-ionic surfactants used in said methods, methods described in WO 2020/158455, for example, can be used, and the document is incorporated herein by reference.

A bolometer of the present embodiment can be manufactured, for example, as follows after such line shape aligned film of semiconducting carbon nanotubes as above being formed on a substrate. Since carbon nanotubes deposit in such a manner as to be aligned in parallel with the line, the aligned film is fabricated in a line shape. First electrodes and second electrodes are fabricated on the carbon nanotube aligned films via, e.g., gold vapor deposition. At this time, the electrodes are installed in such a manner that the direction of alignment of the carbon nanotubes and a direction of electrical current flowing between each first electrode and the corresponding second electrode are approximately parallel to each other.

The material of the electrode is not limited as long as it has conductivity, and gold, platinum, titanium, and the like may be used singly or in combination. The method for producing the electrode is not particularly limited, and examples thereof include vapor deposition, sputtering, and printing method. The thickness may be appropriately adjusted and is preferably 10 nm to 1 mm, and more preferably 50 nm to 1 μm.

In the bolometer of the present embodiment, the distance between the first electrode and the second electrode (channel length) is preferably 1 μm to 500 μm, and more preferably 10 μm to 300 μm. For miniaturization, it is more preferably 1 μm to 200 μm. When the distance between electrodes is 1 μm or more, a reduction in the nature of TCR can be suppressed, even in the case of containing a small amount of metallic carbon nanotubes. In addition, the distance between electrodes of 100 μm or less, for example, 50 μm or less is advantageous when the bolometer is applied to an image sensor by two-dimensionally arraying. The length of the electrode 4 and the electrode 5 is preferably short as long as carbon nanotubes can connect the both electrodes and electrically connect them, the part connecting to carbon nanotubes of 100 μm or less, for examples 50 μm or less is advantageous when the bolometer is applied to an image sensor by two-dimensionally arraying.

Figure 4:
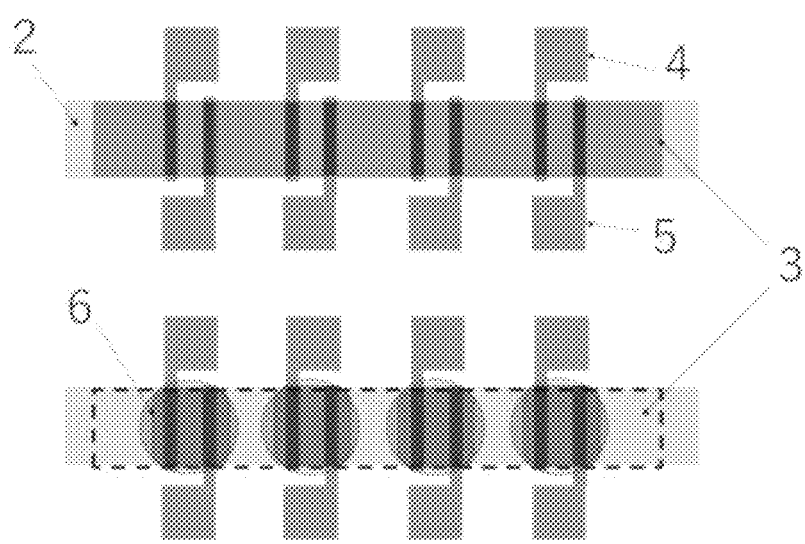
FIG. 4 is an example in which a carbon nanotube film formed on a line shape APTES film is arranged to an electrode line.

As illustrated in FIG. 4, when carbon nanotubes are connected also to an adjacent electrode pair because the carbon nanotube aligned film is in a line shape (extending across a plurality of electrode pairs), for example, unnecessary carbon nanotubes are removed via the following method. An acrylic resin solution such as a polymethylmethacrylate resin (PMMA) is applied to regions 6 each including an area between electrodes on the formed carbon nanotube aligned film to form a protective layer of PMMA. The substrate is heated at 200° C. in the atmosphere, extra solvent, impurities, etc., are removed and then the entire substrate is subjected to oxygen plasma treatment to remove extra carbon nanotubes, etc., present in regions, other than the regions 6 covered by the PMMA layer, of the carbon nanotube layer 3.

Also, as illustrated in FIG. 4, a plurality of lines of APTES applied portions are formed approximately in parallel according to an interval between electrode pair lines, enabling easy arraying.

A protective layer may be provided on the surface of the carbon nanotube layer, if necessary. When the bolometer is used as an infrared sensor, the protective layer is preferably a material with high transparency in the infrared wavelength range to be detected, and acrylic resins such as PMMA, epoxy resins, Teflon® and the like may be used.

Although the above embodiment indicates a bolometer element fabrication method having a sequence of forming an APTES layer on an Si substrate and forming a carbon nanotube layer and then forming electrodes, a fabrication method in which the sequence is changed as follows may be employed. First, a first electrode and a second electrode are fabricated on a washed Si substrate via titanium and gold, or gold vapor deposition or the like, and APTES is applied thereon. For the APTES application, parts other than the line shape portion are masked, and then the substrate is immersed in an APTES aqueous solution or an APTES aqueous solution is sprayed onto the substrate and the substrate is dried. Subsequently, the masking is removed. The APTES application may be applied using, e.g., a dispenser, an inkjet or a printer, and as necessary, washed with water and dried. Although the APTES film is an insulating film, it binds to a surface of a silicon dioxide film of the substrate and presents amino group on the surface, and thus, does not adhere to the gold electrode portions. A carbon nanotube dispersion liquid is allowed to flow thereon, carbon nanotubes are deposited while being aligned, and opposite ends of the formed aligned film are directly connected to the electrodes. When the carbon nanotubes are connected between adjacent electrode pairs, unnecessary carbon nanotubes may be removed via a method similar to the above.

Second Embodiment

Figure 6:
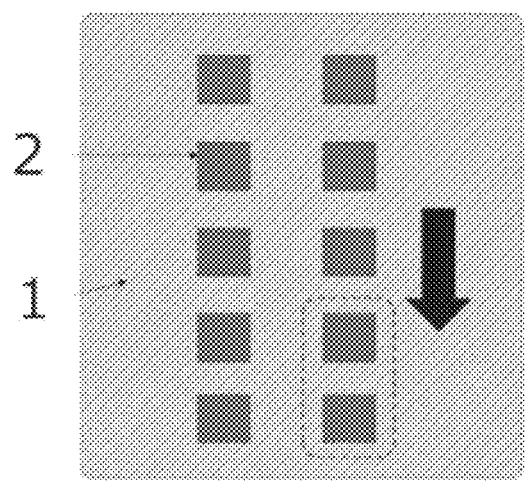
FIG. 6 is a schematic diagram of forming APTES films in a quadrangular shape on a substrate.

FIG. 6 illustrates a schematic plan view of an APTES layer 2 according to an embodiment of the present invention, the APTES layer 2 being formed in a quadrangle or a dash-line shape in which a plurality of quadrangles are arranged in a linear fashion. An Si substrate is washed as in the first embodiment, and parts, other than the quadrangular APTES portions in FIG. 6, are masked, and then, the substrate is immersed in an APTES aqueous solution, or an APTES aqueous solution is sprayed onto the substrate, and the substrate is washed with water and dried. Subsequently, the masking is removed from the substrate. The quadrangular APTES portions may be applied using, e.g., a dispenser, an inkjet or a printer and washed with water and dried.

Figure 7:
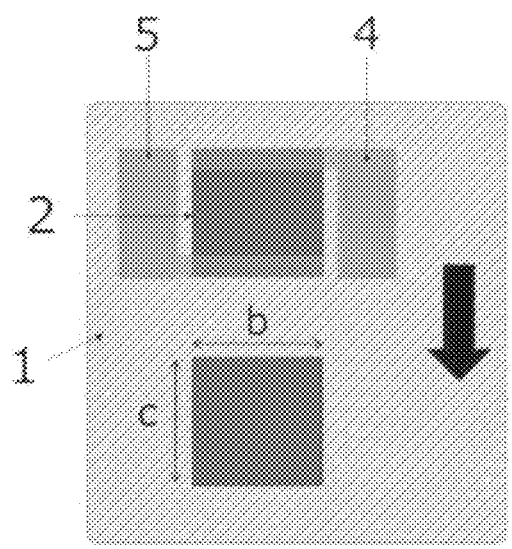
FIG. 7 is a schematic diagram of forming a carbon nanotube film on a quadrangular shape APTES film, and disposing an electrode thereon.

A size of the quadrangular shape is such that a length (width b) of a side that is approximately parallel to a first electrode and a second electrode is, for example, 1 µm to 1 cm, desirably 10 µm to 1 cm, preferably 20 µm to 1 mm, more preferably 30 µm to 300 µm as in FIG. 7. Also, in order to maximize an area in which electrical current flows via the carbon nanotube film, it is preferable that a length b of the quadrangular shape be equal to or larger than an electrode length of a part in which the region of a pair of electrodes facing each other corresponds to a minimum device length. A length (width c) of a side that is approximately perpendicular to the electrodes is, for example, 1 µm to 1 cm, preferably 10 µm to 1 cm, more preferably 20 µm to 1 mm, still more preferably 30 µm to 300 µm. Also, for downsizing, 10 µm to 300 µm is more preferable. Also, it is preferable that the length c (width c) of the quadrangular shape be longer than a device length of an electrode pair, which will be described later. Also, either of the widths b and c may be shorter according to the desired shape of the element.

As in the first embodiment, upon the carbon nanotube dispersion liquid being made to move in one direction on the quadrangular shape APTES adhering portion, carbon nanotubes adhere to the quadrangular shape part in such a manner as to be aligned approximately in parallel with the direction of the movement, and are accumulated.

A bolometer of the present embodiment can be manufactured, for example, as follows after such a quadrangular shape aligned film of semiconducting carbon nanotubes as above being formed on a substrate. FIG. 7 illustrates the dash-line part in FIG. 6. Carbon nanotubes adhere in such a manner as to be aligned in parallel with the dispersion liquid movement direction in FIG. 6 (indicated by an arrow in the figure), and the aligned films are fabricated on entire surface of each of the quadrangular shape parts. Electrodes are fabricated on the carbon nanotube aligned films via gold vapor deposition in such a manner that both a first electrode 4 and a second electrode 5 are in contact with each aligned film. Since each of the aligned films has a quadrangular shape, as in FIG. 7, it is preferable that one pair of sides of the quadrangle be located under electrodes and the other pair of sides be approximately parallel to a direction of electrical current flowing between the first electrode 4 and the second electrode 5. Also, in order to maximize an area in which electrical current flows via the carbon nanotube film, as in FIG. 7, it is preferable that the aligned film be disposed in a part including an entire electrode length of a pair of electrodes facing each other.

In the bolometer of the present embodiment, the distance between the first electrode and the second electrode is preferably 1 µm to 500 µm, and more preferably 5 µm to 300 µm. For miniaturization, it is more preferably 1 µm to 200 µm. When the distance between the electrodes is 1 µm or more, a reduction in the nature of TCR can be suppressed, even in the case of containing a small amount of metallic carbon nanotubes. In addition, the distance between the electrodes of 100 µm or less, for example, 50 µm or less is advantageous when the bolometer is applied to an image sensor by two-dimensionally arraying. The length of the electrode 4 and the electrode 5 is preferably short as long as carbon nanotubes can connect the both electrodes, and electrically connect them, the part connecting to carbon nanotubes of 100 µm or less, for examples 50 µm or less is advantageous when the bolometer is applied to an image sensor by two-dimensionally arraying.

In the present embodiment, as illustrated in FIG. 6, the carbon nanotube aligned films are formed in a dash-line shape, and thus, electrodes can be installed in such a manner that carbon nanotubes are connected between electrodes of each electrode pair. In this case, since there is a part in which no carbon nanotubes exist between adjacent electrode pairs, no step of removing unnecessary carbon nanotubes is needed. Extra solvent, surfactant, etc., can be removed via heating at 200° C. in the atmosphere.

Also in the present embodiment, a protective layer may be provided on the surface of the carbon nanotube layer, if necessary. When the bolometer is used as an infrared sensor, the protective layer is preferably a material with high transparency in the infrared wavelength range to be detected, and acrylic resins such as PMMA, epoxy resins, Teflon® and the like may be used.

Although the above embodiment indicates a bolometer element fabrication method having a sequence of forming an APTES layer on an Si substrate and forming a carbon nanotube layer and then forming electrodes, a fabrication method in which the sequence is changed as follows may be employed. First, a first electrode and a second electrode are fabricated on a washed Si substrate via gold vapor deposition or the like, and APTES is applied thereon. For the APTES application, the substrate is masked such that an APTES film of a quadrangle shape is formed between the electrodes of each electrode pair, and APTES is not applied between the adjacent electrode pairs, and then the substrate is immersed in an APTES aqueous solution or an APTES aqueous solution is sprayed onto the substrate and the substrate is dried. Subsequently, the masking is removed. The quadrangle-shape APTES portion above may be applied using, e.g., a dispenser, an inkjet or a printer, and as necessary, washed with water and dried. Although the APTES film is an insulating film, the APTES layer binds to a surface of a silicon dioxide film of the substrate and presents amino group on the surface, and thus, does not adhere to the gold electrode portions. A carbon nanotube dispersion liquid is allowed to move in one direction on the quadrangular APTES adhering portion, carbon nanotubes adhere to the quadrangular shape portion while being aligned in approximately parallel to the moving direction, and the opposite ends of the formed aligned film are directly connected to the electrodes. Since no carbon nanotube connects between adjacent electrode pairs, a process of removing unnecessary carbon nanotubes using PMMA and the like is not needed.

Other than the process of forming the APTES adhering portion in a quadrangular shape, any component and manufacturing process of the bolometer described in the first embodiment can be appropriately applied, unless otherwise stated.

Third Embodiment

A bolometer according to the present embodiment has a structure that is similar to that in FIG. 1 but uses a plastic substrate instead of an Si substrate 1. Also, polylysine is used instead of an APTES layer 2. Polylysine easily binds to a surface of a plastic substrate, and, like APTES, presents amino group on a surface, and thus, a polylysine film does not repel a carbon nanotube dispersion liquid and easily adheres droplets of dispersion liquid. For a polylysine film application method and a bolometer manufacturing method, steps that are similar to the steps described in the first and second embodiments can be used. The present embodiment enables employment of a flexible substrate and thus can be used for, e.g., a flexible image sensor.

The whole or part of the example embodiments disclosed above can be described as, but not limited to, the following supplementary notes.

[Supplementary Note 1]
A bolometer manufacturing method comprising
fabricating an interlayer having a function that enhances binding between a substrate and a carbon nanotube, in a predetermined shape on the substrate, and
making a semiconducting carbon nanotube dispersion liquid move on the interlayer in one direction relative to the fabricated interlayer.

[Supplementary Note 2]
The bolometer manufacturing method according to supplementary note 1, comprising fabricating the interlayer in a line shape or a quadrangular shape.

[Supplementary Note 3]
The bolometer manufacturing method according to supplementary note 2, comprising providing or moving the semiconducting carbon nanotube dispersion liquid a plurality of times in one direction from an end of the line shape or quadrangular shape interlayer.

[Supplementary Note 4]
The bolometer manufacturing method according to supplementary note 2 or 3, wherein a width of the line shape is 1 μm to 10 cm.

[Supplementary Note 5]
The bolometer manufacturing method according to supplementary note 2 or 3, wherein a length of a shorter side of the quadrangular shape is 1 μm to 1 cm.

[Supplementary Note 6]
The bolometer manufacturing method according to any one of supplementary notes 1 to 5, wherein a thickness of the carbon nanotube deposited on the interlayer is 500 nm or less in average.

[Supplementary Note 7]
The bolometer manufacturing method according to any one of supplementary notes 1 to 6, wherein the interlayer is a layer of a silane coupling agent and the substrate is an Si substrate.

[Supplementary Note 8]
The bolometer manufacturing method according to any one of supplementary notes 1 to 7, comprising a step of forming the interlayer using an aminosilane compound aqueous solution having a concentration of 0.001% by volume or more and 30% by volume or less, wherein the substrate is an Si substrate.

[Supplementary Note 9]
The bolometer manufacturing method according to supplementary note 8, wherein the aminosilane compound is 3-aminopropyltriethoxysilane (APTES).

[Supplementary Note 10]
The bolometer manufacturing method according to any one of supplementary notes 1 to 6, wherein the interlayer is a cation polymer layer and the substrate is a plastic substrate.

[Supplementary Note 11]
The bolometer manufacturing method according to supplementary note 10, wherein the interlayer is a layer of a cation polymer including amino group and the substrate is a plastic substrate.

[Supplementary Note 12]
The bolometer manufacturing method according to any one of supplementary notes 1 to 11, wherein the semiconducting carbon nanotube dispersion liquid comprises 90% by mass or more of semiconducting carbon nanotubes in a total amount of carbon nanotubes.

[Supplementary Note 13]
The bolometer manufacturing method according to any one of supplementary notes 1 to 12, wherein the bolometer is an infrared sensor.

[Supplementary Note 14]

The bolometer manufacturing method according to any one of supplementary notes 1 to 13, wherein the bolometer is a bolometer array.

EXAMPLES

The present invention will be described further in detail by way of examples below, but the present invention should not be limited by the following examples.

Example 1

100 mg of single-walled carbon nanotubes (Meijo Nano Carbon Co., Ltd., EC 1.0 (diameter: about 1.1 to 1.5 nm (average diameter 1.2 nm)) was put in a quartz boat and heat treatment was performed under a vacuum atmosphere using an electric furnace. The heat treatment was performed at a temperature of 900° C. for 2 hours. The weight after heat treatment was reduced to 80 mg, and it was found that the surface functional groups and impurities were removed. After the obtained single-walled carbon nanotubes were fractured with tweezers, 12 mg of which was immersed in 40 ml of an aqueous solution of 1 wt % surfactant (polyoxyethylene (100) stearyl ether) and after sufficient sedimentation, the mixture was subjected to ultrasonic dispersion treatment (BRANSON ADVANCED-DIGITAL SONIFIER apparatus, output: 50 W) for 3 hours. Through this step, aggregates of the carbon nanotubes in the solution were eliminated. Through this procedure, bundles, remaining catalysts, and the like were removed to obtain a carbon nanotube dispersion liquid. The dispersion liquid was applied on a $SiO_2$ substrate and dried at 100° C., which was then observed by an atomic force microscope (AFM) to observe the length and the diameter of carbon nanotubes. As a result, it was found that 70% of the single-walled carbon nanotubes had a length within a range of 500 nm to 1.5 μm and the average length thereof was approximately 800 nm.

The above obtained carbon nanotube dispersion liquid was introduced into the separation apparatus having a double tube structure. About 15 ml of water, about 70 ml of the carbon nanotube dispersion liquid, and about 10 ml of 2 wt % aqueous surfactant solution were put into the outer tube of the double tube, and about 20 ml of 2 wt % aqueous surfactant solution was also put into the inner tube. Thereafter, the bottom lid of the inner tube was opened, resulting in a three-layer structure having different surfactant concentrations. A voltage of 120 V was applied with the bottom side of the inner tube being anode, and the upper side of the outer tube being cathode, and semiconducting carbon nanotubes were transferred towards the anode side. On the other hand, metallic carbon nanotubes were transferred towards the cathode side. After 80 hours from the start of separation, semiconducting carbon nanotubes and metallic carbon nanotubes were separated cleanly. The separation step was carried out at room temperature (about 25° C.). The semiconducting carbon nanotube dispersion liquid transferred to the anode side was collected and analyzed using the light absorption spectrum, and it was found that the metallic carbon nanotubes components were removed. It was also found from the Raman spectrum that 99 wt % of the carbon nanotubes in the carbon nanotube dispersion liquid transferred to the anode side were semiconducting carbon nanotubes. The most frequent diameter of the single-walled carbon nanotubes was about 1.2 nm (70% or more), and the average diameter was 1.2 nm.

The surfactant was partially removed from the carbon nanotube dispersion liquid containing 99 wt % semiconducting carbon nanotubes as described above (the carbon nanotube dispersion liquid transferred to the anode side) to adjust the concentration of the surfactant to be 0.05 wt %. Thereafter, the carbon nanotube dispersion liquid was adjusted into a carbon nanotube dispersion liquid A having a carbon nanotube concentration in the dispersion liquid of 0.01 wt % (referred to as dispersion liquid A). This dispersion liquid A was used to form a carbon nanotube layer.

An Si substrate coated with $SiO_2$ was sequentially washed with acetone, isopropyl alcohol and water and subjected to oxygen plasma treatment to remove organic substances on a surface. As in FIG. 2A (upper diagram), parts, other than line-shape APTES portions having a width of approximately 300 μm, of the substrate were masked by a kapton tape, and then, the substrate was immersed in a 0.1% by volume APTES aqueous solution for 30 minutes, and then the kapton tape was removed from the substrate and the substrate was dried.

Upon the substrate being inclined at approximately 15° and a carbon nanotube dispersion liquid A being dripped onto an end of each line-shape APTES adhering portion via an injector to introduce the carbon nanotube dispersion liquid A in such a manner as to flow on the line-shape APTES in one direction, the parts to which no APTES adhered (masked parts) repelled the dispersion liquid and the carbon nanotube dispersion liquid flowed only on the APTES adhering portions. Carbon nanotubes were made to adhere onto the APTES using 200 μL in total of the carbon nanotube dispersion liquid A by an operation of collecting the dispersion liquid after movement and dripping the dispersion liquid again being repeatedly performed. The operation was performed at a temperature of 23° C. and a relative humidity of 60% RH. The substrate was washed with water, ethanol and isopropyl alcohol and then dried at 110° C. Subsequently, the substrate was heated at 200° C. in the atmosphere to remove a non-ionic surfactant, etc., in the dispersion liquid A. An SEM observation of carbon nanotube films on the APTES showed that the carbon nanotubes adhered in such a manner as to be aligned in parallel with the APTES lines as in the SEM image in FIG. 3. Also, the SEM image was subjected to two-dimensional Fourier transform processing to calculate an integrated value f of amplitudes at frequencies $-1$ μm$^{-1}$ to $+1$ μm$^{-1}$ in one direction from a center, and where fx is an integrated value relating to a direction x in which the integrated value f becomes maximum and fy is an integrated value relating to a direction y perpendicular to the direction x, fx/fy was calculated to be 2.2. A thickness of the carbon nanotube layer was measured using a laser microscope and the thickness was approximately 20 nm in average (average value of 10 random points).

Gold was vapor-deposited on each of the carbon nanotube aligned films obtained above as a first electrode and a second electrode in such a manner as to have a thickness of 300 nm and provide a space of 100 μm between the electrodes, to fabricate the electrodes. At this time, the electrodes were installed in such a manner that the APTES lines, that is, the alignment direction of the aligned carbon nanotubes, and a direction in which electrical current flows between the electrodes of each electrode pair were approximately parallel to each other. Next, regions including carbon nanotubes and parts of connection between the first electrode and the second electrode and the carbon nanotubes were protected by application of a PMMA anisole solution. Subsequently, the substrate was dried for one hour under a condition of 200° C. in the atmosphere and unnecessary carbon nanotubes connecting to adjacent electrode pairs were removed via oxygen plasma treatment.

Comparative Example 1

A carbon nanotube dispersion liquid A was prepared as in the steps of Example 1. After an Si substrate being washed as in Example 1, APTES was made to adhere to an entire surface of the substrate without the substrate being masked. Upon approximately 200 μL of the dispersion liquid A being dripped onto the substrate, the dispersion liquid A spread to the entire surface of the substrate. The substrate was washed with water, ethanol and isopropyl alcohol and then dried at 110° C. and subsequently heated at 200° C. in the atmosphere to remove a non-ionic surfactant, etc. An SEM observation of the substrate showed that the carbon nanotubes adhered to the substrate in a random network form. A thickness of the carbon nanotube layer was measured using a laser microscope and the thickness was approximately 10 nm in average.

Thereafter, gold was vapor-deposited on the carbon nanotube layer as a first electrode and a second electrode in such a manner as to have a thickness of 300 nm and provide a space of 100 μm between the electrodes. Carbon nanotubes, and the first electrode and the second electrode were protected with PMMA with the same area as in Example 1, dried for one hour under a condition of 200° C. in the atmosphere, and unnecessary carbon nanotubes were removed via oxygen plasma treatment.

Comparison Between Example 1 and Comparative Example 1

Table 1 indicates a result of film resistance measurement at 300 K and a TCR value in a range of 20° C. to 40° C. for each of bolometers fabricated from respective carbon nanotube films obtained in Example 1 and Comparative Example 1. It turned out that the aligned carbon nanotube film in Example 1 had a film resistance one digit lower than that of Comparative Example 1. This is because in Example 1, areas of points of contact between electrical conduction paths of carbon nanotubes increased because of alignment of the carbon nanotubes. As a result, at the time of sensor fabrication, noise was reduced and sensitivity was enhanced.

TABLE 1

Measurement Results of Resistance and TCR

|  | Example 1 | Comparative Example 1 |
| --- | --- | --- |
| Film Resistance (Ω) | $2 \times 10^8$ | $1 \times 10^9$ |
| TCR (%/K) | −6.5 | −5.2 |

EXPLANATION OF REFERENCE

1 Si substrate
2 APTES layer
3 Carbon nanotube layer
4 First electrode
5 Second electrode
6 PMMA layer

What is claimed is:

1. A bolometer manufacturing method comprising fabricating an interlayer having a function that enhances binding between a substrate and a carbon nanotube, in a line shape or a quadrangular shape on the substrate, and
providing or moving semiconducting carbon nanotube dispersion liquid from a line shape or a quadrangular shape in one direction relative to the interlayer a plurality of times or continuously,
wherein the one direction is the same as the arrangement direction of the line-shaped or quadrangular-shaped pattern.

2. The bolometer manufacturing method according to claim 1, wherein a width of the line shape is 1 μm to 10 cm.

3. The bolometer manufacturing method according to claim 1, wherein a length of a shorter side of the quadrangular shape is 1 μm to 1 cm.

4. The bolometer manufacturing method according to claim 1, wherein a thickness of the carbon nanotube deposited on the interlayer is 500 nm or less in average.

5. The bolometer manufacturing method according to claim 1, wherein the interlayer is a layer of a silane coupling agent and the substrate is an Si substrate.

6. The bolometer manufacturing method according to claim 1, comprising forming the interlayer using an aminosilane compound aqueous solution having a concentration of 0.001% by volume or more and 30% by volume or less, wherein the substrate is an Si substrate.

7. The bolometer manufacturing method according to claim 1, wherein the interlayer is a cation polymer layer and the substrate is a plastic substrate.

8. The bolometer manufacturing method according to claim 1, wherein the semiconducting carbon nanotube dispersion liquid comprises 90% by mass or more of semiconducting carbon nanotubes in a total amount of carbon nanotubes.

9. The bolometer manufacturing method according to claim 1, wherein the speed at which the semiconducting carbon nanotube dispersion liquid provides or moves on the interlayer in one direction relative to the interlayer is 10 mm/sec or less.

10. The bolometer manufacturing method according to claim 1, wherein making the substrate on which the interlayer formed move in one direction in a liquid bash of the carbon nanotube dispersion liquid by transportation means or a tool capable of pulling and pushing.

11. The bolometer manufacturing method according to claim 1, wherein dropping a droplet of the dispersion liquid onto the line end or the square end and made to flow by the substrate being inclined, and the angle of the inclination of the substrate is 5° or more and 90° or less.

12. A bolometer manufacturing method comprising
masking a portion other than a predetermined shape of a substrate,
fabricating an interlayer having a function that enhances binding between a substrate and a carbon nanotube, in the predetermined shape on the substrate,
removing the mask, and
making a semiconducting carbon nanotube dispersion liquid move on the interlayer in one direction relative to the fabricated interlayer.

13. A bolometer manufacturing method comprising
fabricating an interlayer having a function that enhances binding between a substrate and a carbon nanotube, in a predetermined shape on the substrate, and making a semiconducting carbon nanotube dispersion liquid move on the interlayer in one direction relative to the fabricated interlayer,
wherein the interlayer is a cation polymer layer and the substrate is a plastic substrate.

* * * * *